United States Patent [19]

Swensrud et al.

[11] Patent Number: 4,650,959
[45] Date of Patent: Mar. 17, 1987

[54] WELDING WIRE FEEDING APPARATUS WITH ORBITAL MOUNTING ASSEMBLY

[75] Inventors: Roger L. Swensrud, Plub Borough; James R. Ziegler, Clairton; Daniel P. Soroka, Imperial; Donald L. Wolfe, Allison Park, all of Pa.

[73] Assignee: Westinghouse Electric Corp., Pittsburgh, Pa.

[21] Appl. No.: 840,354

[22] Filed: Mar. 17, 1986

[51] Int. Cl.⁴ .............................................. B23K 9/12
[52] U.S. Cl. .............................. 219/125.1; 219/137.2; 901/42
[58] Field of Search ............. 219/125.1, 137.2, 125.11; 901/42

[56] References Cited
U.S. PATENT DOCUMENTS
4,538,046  8/1985  Kazlauskas ..................... 219/125.1

Primary Examiner—Clifford C. Shaw
Attorney, Agent, or Firm—Thomas R. Trempus

[57] ABSTRACT

A welding wire feeding apparatus with orbital mounting assembly for use in combination with an industrial manipulator of the type including a "Z" axis assembly from which there is dependingly supported an extended welding axis post for rotational movement about the "Z" axis. The improved welding wire feeding apparatus mounting assembly is rotatably mounted on the bottom of the "Z" axis or wrist assembly of the robot and is in communication with the extended axis post by a rubber-lined yoke so that the rotational movement of the orbital welding wire feeding apparatus is simultaneous with that of the extended welding post. As a result of a support bearing and the attachment through a rubber-lined yoke, no mass or stiffness coupling occurs between the wire feeding apparatus and the extended axis post so that the natural frequencies of the extended axis post remain unchanged.

4 Claims, 5 Drawing Figures

WELDING WIRE FEEDING APPARATUS WITH ORBITAL MOUNTING ASSEMBLY

BACKGROUND OF THE INVENTION

1. Field of the Invention:

The invention relates to a welding wire feeding apparatus in general, and more particularly the invention provides a welding wire feeding apparatus mounting technique which is particularly well suited for use with an industrial manipulator which includes an extended welding post depending from the "Z" axis for use in deep vessel welding applications.

2. Description of the Prior Art:

The use of robots in arc welding has been and continues to be a significant component of programs dedicated to industrial automation. A particularly attractive feature of robotic welding lies in the fact that it represents true human replacement, and as such, handles standard welding equipment. For very basic applications, all that is needed is a fitting to mount the welding gun which is attached to its long gas lines and wire feed mechanisms onto the robot's hand. All other equipment associated with the arc welder will then operate in a normal fashion as if being manipulated by human operators. The task performed by the robot is mainly to guide the arc welding gun around the programmed path and to signal when it is on station and ready to proceed. The welding unit controller does the rest. However, despite the apparent simplicity involved in moving a welding gun around a given path, welding operations, even by robots, are a very difficult task and present significant challenges in the design of a robot.

The wrist which supports the welding torch must meet certain requirements in order to adequately carry out the welding operation. For example, in on type of weld tracking methodology there is a need for the wrist to provide an oscillation weave of about 3 to 5 millimeters at a frequency of between about 3 to 5 Hz. U.S. patent application Ser. No. 622,293 filed June 19, 1984 entitled "Wrist and Post for Welding Robots" by Swensrud et al. and assigned to the assignee of the present invention teaches a unique welding torch wrist for such applications.

In addition to the size of the supporting wrist, another significant problem in conventional automated welding systems resides in the axis post that supports the wrist and connects the wrist to the main body of the industrial manipulator. The length and configuration of the axis post in combination with the wrist used therewith have a direct impact on the welding capabilities of the automated device and the accessibility of that device to a given job. Heretofore, the results have been that welding can be accomplished, for example, within the inner surface of a vessel. However, the size of the vessel in which welding operations can be effected is limited by both the length and configuration of the post as well as the configuration of the wrist. Additionally, the weave speed of 3 to 5 Hz necessary for certain arc welding operation generates deflection in the post due to the fundamental natural frequency at or near the weave speed. Thus, rather than simply being a matter of upscaling the access post of a welding unit by increasing its length, serious attention to the large deflections developed therein during welding operations must be addressed. A first step toward eliminating the problems associated with axis-post deflection is also taught in the aforedescribed U.S. patent application Ser. No. 622,293.

A necessary mechanism in a system for performing metal arc welding (MIG Welding) is a wire feed unit. This arc welding process generates heat by an arc between a consumable electrode and the weld metal. The electrode is a bare metal, solid wire which is continuously fed from the wire feeder unit to the torch tip. It has been the practice to use stationary wire feed units mounted on the robot. This has become a problem in an application where an extended axis post and thus the torch must rotate to provide a full 360° of welding range. The stationary wire feed unit mount which is conventionally utilized presents severe limitations to extending the flexibility of the welding robot. This is because it is now possible through the teachings of the aforedescribed patent application to provide an extended axis post which can rotate 360° for the complete peripheral welding of a vessel and with the conventional wire feed unit mount, the welding wire is twisted about the extended axis post. Moreover, when a vessel being welded is very deep, the post required is very long. Finally, because of the type of material to be welded, the electrode weld wire often consists of soft metal and this presents limitations in the deliverability of that wire from a fixed wire feed unit location to the torch tip. A proposed solution has been the use of push-pull wire feed systems which are typically associated with low strength, soft electrode wire. Such devices are, however, larger than is desired and because space is limited in such welding operations, the push-pull wire feed system has been found to be unacceptable.

It is, therefore, an object of this invention to provide an improved wire feeder apparatus with orbital mounting arrangement for welding applications in which an industrial manipulator is equipped with an extended welding post onto which a welding device is mounted.

It is another object of this invention to provide an improved welding robot apparatus which permits 360° of welding inside of deep vessels.

It is yet another object of this invention to provide a wire feed unit mounting arrangement which can be utilized in combination with an extended axis post while not affecting the natural frequency of the post which results in unacceptable torch tip amplitudes.

SUMMARY OF THE INVENTION

The present invention provides an orbital welding wire feeding apparatus arrangement for use in combination with an industrial manipulator including a "Z" axis assembly from which there is dependingly supported an extended welding axis post for 360° rotation about a vertical axis on which a welding device is supported for arc welding. The improved welding wire feeding apparatus of this invention continuously delivers welding wire to the welding device and is mounted in association with the industrial manipulator and extended axis post so as to rotate with the extended axis post during the welding operations. The orbital wire feeding apparatus is mounted at the extended axis post and is supplied with its own baseplate, support bearing by which it is rotatably supported from the bottom of the "Z" axis assembly which can include a wrist assembly, of the industrial manipulator. The freely rotatable orbital wire feed unit baseplate is in contact with the extended axis post to a rubber-lined yoke so that no mass or stiffness coupling occurs and thus no natural frequency change to the extended axis post results. Thus, as the "X" axis assembly effects the movement of the extended axis post, the orbital wire feeder apparatus by means of its rotatably mounted baseplate rotates in conjunction with the extended axis post through the yoke mounted on the baseplate and in contact with the extended axis post.

BRIEF DESCRIPTION OF THE DRAWINGS

The above as well as other features and advantages of the present invention can be more clearly appreciated through consideration of the detailed description of the invention in conjunction with the several drawings in which.

DETAILED DESCRIPTION OF THE INVENTION

The improved welding wire feeding apparatus mounting assembly of this invention can be used in combination with any of several commercially available industrial welding wire feed units. Accordingly, it is to be appreciated that the wire feed unit described herein is for illustrative purposes only and is by no means to be construed as limiting the application of the orbital mounting assembly of this invention.

Figure 1:
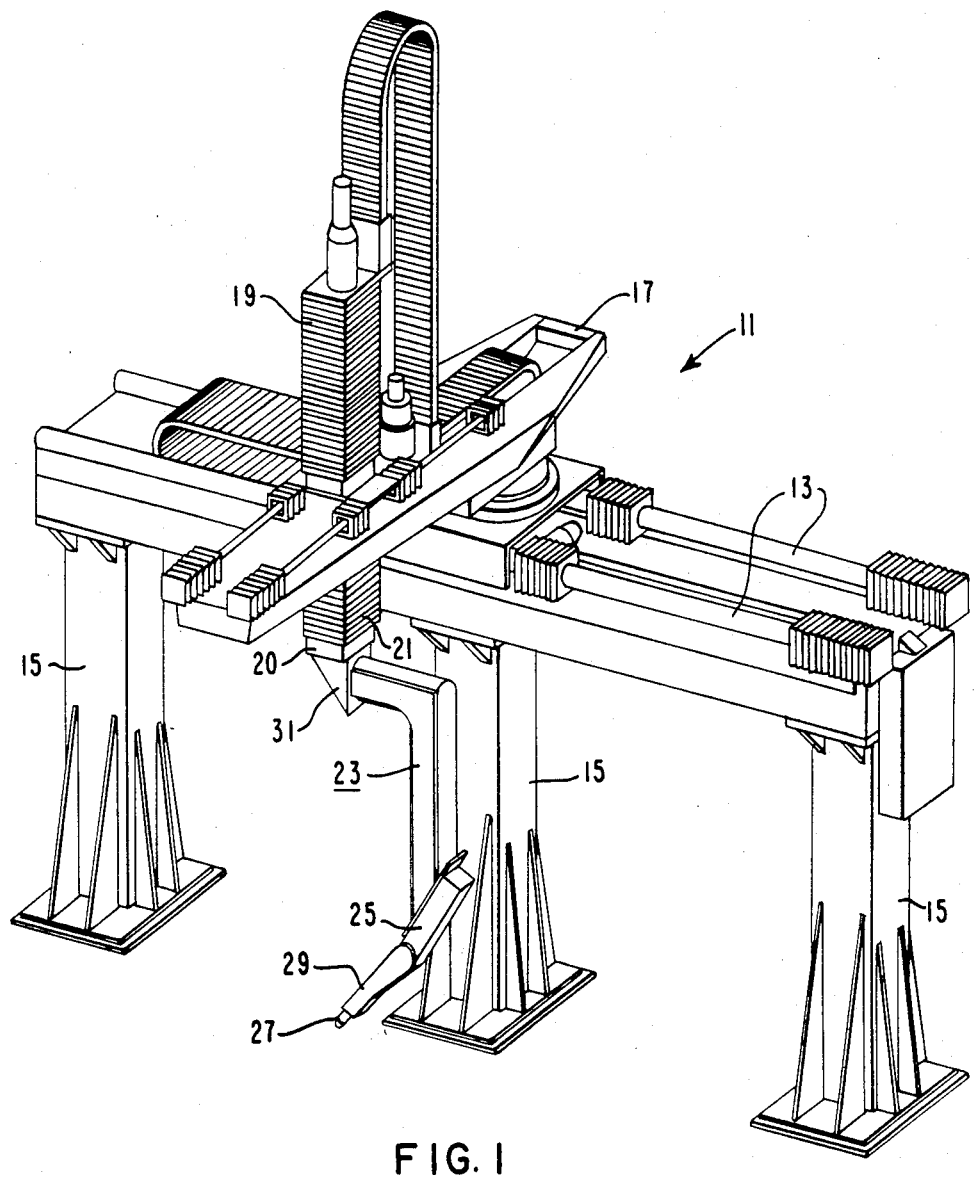
FIG. 1 is a perspective view of an industrial robot designed for arc welding application and including an axis post and welding torch wrist for use in combination with the welding wire feeding apparatus and mounting assembly as shown in FIG. 2 of this invention.

Turning to FIG. 1, an industrial robot designed for arc welding, burning, light machining, heavy assembly and material handling applications is generally indicated by the reference character 11. This industrial robot 11 is commercially available from the Westinghouse Electric Corporation and is known as the Unimate Series 6000 Robot. This industrial manipulator is a gantry-type design with an overhead "X" axis defined by rails 13 which are supported by vertical structural members of columns 15. The "Y" axis extends from the "X" axis and consists of a pivotable arm member 17. The arm 17 supports the vertical "Z" axis consisting of member 19. This orthogonal configuration delivers travel along the "X" axis, along the "Y" axis and vertical travel along the "Z" axis, providing an extended working envelope. All axes are driven by DC servo motors with precision feedback in a closed-loop system.

The free end 21 of the "Z" axis assembly 19 supports an extended axis post 23 with a welding torch mounted thereon. The extended axis post 23 depends downwardly from the free end 21 of the "Z" axis assembly and is rotatably movable through 360° relative to the free end 21 of the "X" axis assembly by means of a wrist 20. A welding torch wrist 25 is mounted on the opposite end of the post 23 and supports a welding torch 27 by means of a pivotal welding torch support housing 29.

Figure 2:
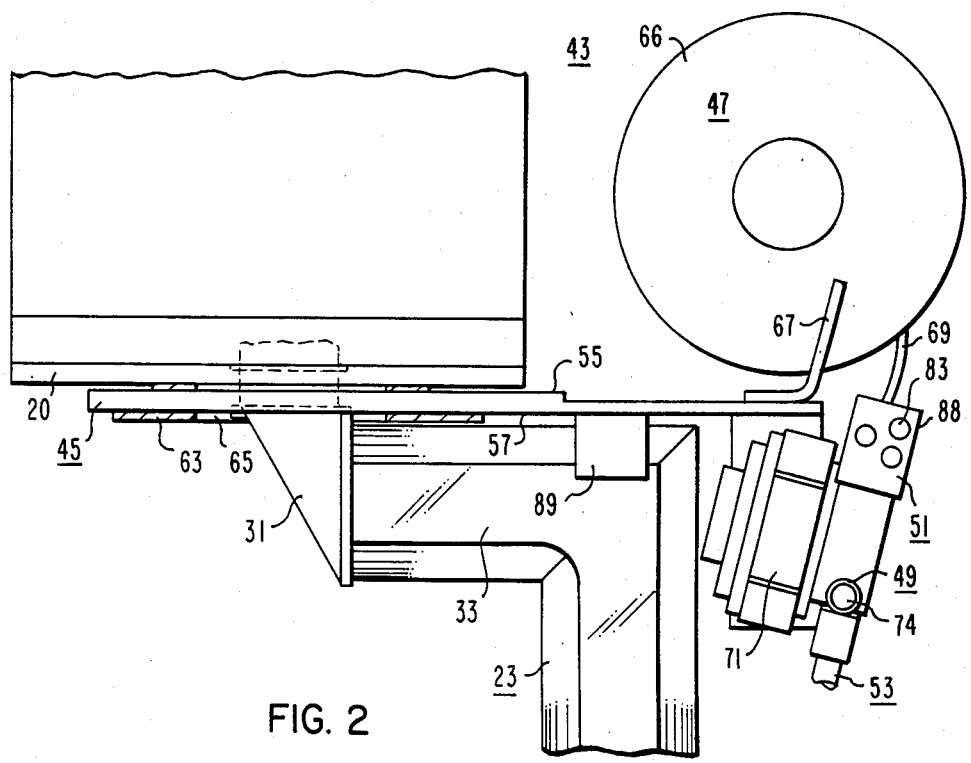
FIG. 2 is a elevational view of the improved welding wire feeding apparatus with orbital mounting assembly according to the teachings of this invention.
Figure 3:
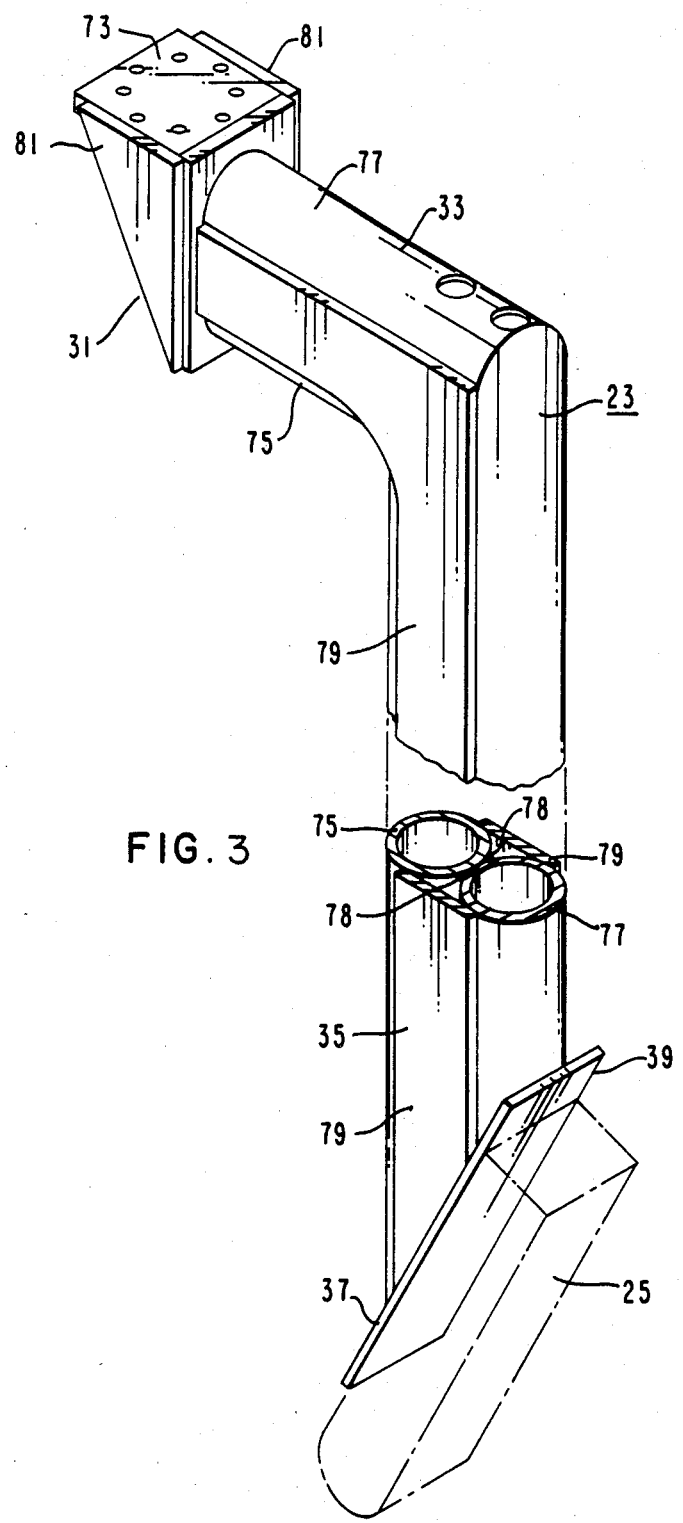
FIG. 3 illustrates in perspective view an improved axis post used in combination with the improved welding wire feeding apparatus and mounting assembly of this invention.

As can be more clearly seen in FIGS. 2 and 3, the extended axis post 23 is shaped in the configuration having a first portion 31 which is axially aligned with the "Z" axis and is supported from the robot wrist and secured thereto. The center or second portion 33 of the extended post 23 is substantially perpendicular to the first section 31 and serves to radially space the elongated portion of the post 35 relative to the "Z" axis about which the extended axis post rotates. The elongated portion 35 and the mounting portion 31 of the extended axis post 23 are substantially parallel with respect to each other. The end 37 of the post 23 distal from the robot manipulator arm 19 has a seat 39 thereon. A wrist housing 25 is adapted to be mounted onto the seat 39 so that the torch 27 can be oriented to intersect the "Z" axis. The structure and method of fabrication for the extended post 23 can be seen through consideration of both FIGS. 2 and 3. The post 23 includes an elongated portion 35 extending between the wrist seat 39 and a dogleg or portion 33 which radially spaces the elongated portion from the "Z" axis onto which the post is mounted. The first portion 31 of the elongated post can either be a mounting bracket as at 73 which is secured to the bottom or free end of the robot's wrist 20 or an integral shaft portion which is mounted within the robot. A bracket 39 is angularly disposed thereon. In any event, the construction of sections 33 and 35 of the post is the most important factor in the elongated post's capabilities. Sections 33 and 35 of the post consist of thin-walled tubing. Two lengths of tubing 75 and 77 are welded together as at 78 along with side plates 79 and gussets 81 to provide a desired post stiffness in the primary forcing function direction. Considering the dogleg portion 33, the tubing members 75 and 77 are vertically stacked and welded together at coincident surfaces. The side plates 79 which provide additional stiffness are welded to both sides of the previously stacked and welded tubes 75 and 77 and extended along the portion 33 and preferably, a significant length of portion 35. Gussets 81 provide support to the L-shaped mounting bracket 73 by which the post is connected to the robot's wrist 20.

Figure 4:
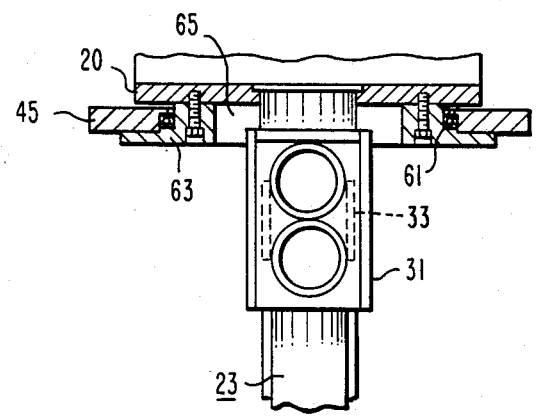
FIG. 4 is a sectional detailed view of the manner in which the wire feeding apparatus mounting plate is rotatably mounted onto the base of the industrial manipulator "Z" axis assembly or wrist assembly.

The improved welding wire feeding apparatus orbital mounting assembly of this invention for use with the aforedescribed industrial manipulator and extended welding post can be appreciated through consideration of FIGS. 2 and 4. The welding wire feeding apparatus of this invention is generally indicated by the reference character 43. The wire feeder 43 includes a mounting baseplate 45, a reel spool means 47, a wire drive means 49, a set of leveling rollers 51 and an insulated tube means 53.

The mounting baseplate 45 has a first side 55 and a second side 57 opposite thereto. The mounting baseplate 45 has an aperture 65 through which the "Z" axis passes. Additionally, the mounting bracket of the extended axis post is attached to the wrist of the industrial manipulator via the bracket 73 which passes freely through the aperture 65. (This arrangement would permit the extend axis post to function without interference from the mounting baseplate 45.) That end of the mounting baseplate 45 in which the aperture 65 is disposed is mounted for rotational movement about the vertical axis or "Z" axis by bearing means 61. As can be seen in the cross-sectional view of FIG. 4, a bearing means 61 is supported by a non-rotating inner race cap 63 which is secured to the bottom face 65 of the industrial manipulator wrist 20. The bearing means 61 supports the rotatable mounting baseplate 45.

The reel spool means 47 includes a spool 66 which is rotatably supported by bracket means 67 on the mounting baseplate 45 first side 55. A supply of welding wire 69 is stored on the spool 66 and played out therefrom by means of the wire drive means 49. The wire drive means 49 is supported on the second side 57 of the mounting baseplate 45 for positively engaging and drawing the welding wire 69 from the reel spool means 47. The wire drive means 49 includes a controllable motive means generally indicated at 71 which is in communication with a drive wheel 74 through appropriate gearing or the like. A set of leveling roller means 51 is mounted between the reel spool means 47 and the wire drive means 51. Typically, the leveling roller means 51 is located just before the wire drive means in order to straighten the welding wire as it is unreeled from the reel spool means 47. The set of leveling roller means 51 typically includes three roller means 83 which are mounted for free rotation within a support housing 88. An insulated tube means 53 extends from a location which is proximate the wire drive means 49 to a second location proximate the welding device 29. The insulated tube means 53 provides a path through which the welding wire is conveyed substantially the length of the extended welding post 23.

Figure 5:
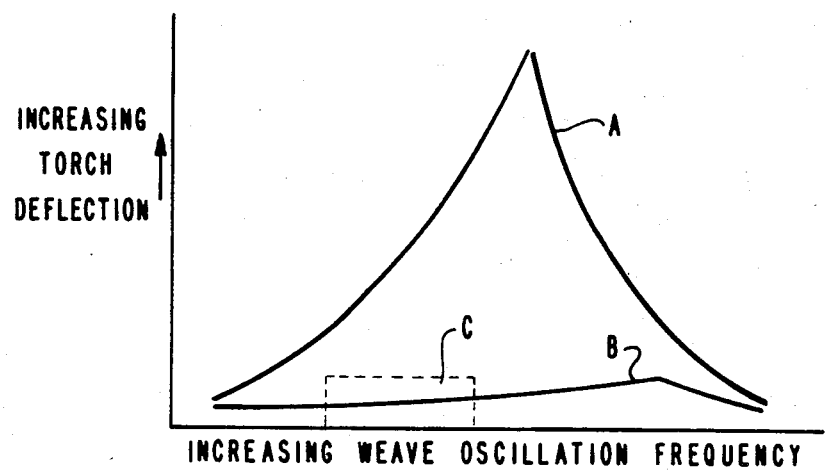
FIG. 5 is a graph demonstrating the stiffness characteristics of an industrial manipulator extended axis post utilizing the improved welding wire feeding apparatus supported on the mounting assembly of this invention as a function of the weave frequency of a torch-mounted wrist.

The wire feed device 43 as supported on the mounting baseplate 45 is freely rotatable about the vertical axis defined by the "Z" axis assembly of the industrial manipulator. In order to provide simultaneous rotation of the mounting baseplate 45 supported welding wire feeding apparatus 43 with the extended axis post 23, a rubber-lined yoke 89 is affixedly secured to the second face 57 of the mounting baseplate 45 and is in communication with the horizontal portion 33 of the post 23. The yoke 89 is an inverted 'U' like member, the base of which is fixedly attached to the bottom of the baseplate 45 and the sides of which straddle the horizontal portion 33 of the extended axis post. The mass of the welding wire feeding apparatus 43 is supported by the bearing structure 61 described above and the baseplate is in communication with the extended axis post 23 through the yoke 89. As a result, no mass or stiffness coupling occurs and thus no natural frequency changes in the extended axis post are experienced. As can be seen in the graph of FIG. 5, the plot marked A shows the displacement of a welding post system which does not incorporate the improved extended axis post and wire feed mechanism of this invention. On the other hand, the plot marked B illustrated an extended axis post of the type described herein used in combination with the wire feeding apparatus with orbital mounting assembly of this invention. The acceptable range of torch deflection and desired weave oscillation frequency is shown on the graph at C. As can be seen, the preferred embodiment shows virtually no appreciable weave displacement at desired operational weave frequencies. Moreover, only moderate displacement is noted at significantly increased weave frequencies. On the other hand, significant displacement is noted in the A plot even at moderately low weave frequencies. The extended axis post is characterized by its stiffness and its very light-weight structure. These characteristics are required so that low-beam type natural frequencies can be avoided. Otherwise, torch-tip oscillation during welding would tend to excite post wrist natural frequencies that are at or near the forcing frequency, resulting in large unacceptable torch-type deflections or displacements. Since the forcing frequency is relatively low, to be successful the post-wrist assembly fundamental natural frequency must be relatively high, that is, above the maximum acceptable weave frequencies. However, post weight must be minimized in order to comply with the capabilities of the robot being used. Based on the requirements described above, the natural frequency of the thin-walled tubing was changed from unacceptable ranges and the amplitude at resonance was reduced from 0.25 to 0.020 inches. At the typical 5 Hz operating frequency, the wrist and post are relatively still and well within the acceptable limits of torch-tip deflection. These design criteria, as identified and disclosed in U.S. patent application Ser. No. 622,293, are maintained and the operational capability of the welding robot in which this extended post used enhanced through the incorporation of the welding wire feeding apparatus with orbital mounting assembly of this invention.

What has been described is an improved welding wire feeding apparatus mounting assembly for use in combination with an extended axis post in an industrial manipulator. The mounting technique utilized in this invention permits full 360° of motion about the "Z" axis of an industrial manipulator.

What is claimed is:

1. In combination with an industrial manipulator including a "Z" axis assembly from which there is dependingly supported an extended welding post for rotational movement about a vertical axis on which a welding device is supported for gas metal arc welding, an improved welding wire feeding apparatus and mounting assembly for continuously delivering welding wire to the welding device comprising:
   a mounting baseplate means having a first end with an aperture therethrough and a second end opposite thereto and a first side and a second second side, which mounting baseplate means is disposed between the "Z" axis assembly and the extended welding post for independent rotational movement about the vertical axis which rotational movement is coordinated with the rotational movement of the extended welding post and wherein the extended welding post depends from the "Z" axis assembly through said aperture;
   a reel spool means rotatably supported on the first side of said mounting baseplate means for rotation about a horizontal axis and on which a supply of welding wire is stored;
   a wire drive means supported on the second side of said mounting baseplate for positively drawing the welding wire from the reel spool means supply for delivery to the welding device;
   a set of leveling roller means mounted between said reel spool means and said wire drive means and through which the welding wire passes; and
   insulated tube means extending from a location proximate said wire drive means to a second location proximate the welding device through which the welding wire is conveyed substantially the length of the extended welding post.

2. The combination according to claim 1 wherein the mounting baseplate means rotational movement is coordinated with the movement of the extended welding post by means of a yoke means mounted on the second face of the mounting baseplate and in communication with the extended welding post.

3. The combination according to claim 2 wherein the yoke means is fixedly supported from said mounting baseplate means and includes a rubber portion which is in contact with the extended axis post.

4. The combination according to claim 1 wherein the mounting baseplate means is rotatably mounted on the "Z" axis assembly by bearing means.

* * * * *